US009330395B2

(12) United States Patent
Hauser

(10) Patent No.: US 9,330,395 B2
(45) Date of Patent: May 3, 2016

(54) SYSTEM, METHOD AND COMPUTER READABLE MEDIUM FOR DETERMINING ATTENTION AREAS OF A WEB PAGE

(75) Inventor: Robert R. Hauser, Frisco, TX (US)

(73) Assignee: SUBOTI, LLC, Frisco, TX (US)

( * ) Notice: Subject to any disclaimer, the term of this patent is extended or adjusted under 35 U.S.C. 154(b) by 730 days.

(21) Appl. No.: 12/435,767

(22) Filed: May 5, 2009

(65) Prior Publication Data

US 2010/0287028 A1 Nov. 11, 2010

(51) Int. Cl.
*G06F 3/048* (2013.01)
*G06Q 30/02* (2012.01)

(52) U.S. Cl.
CPC ............ *G06Q 30/0201* (2013.01); *G06Q 30/02* (2013.01)

(58) Field of Classification Search
CPC ............ G02B 13/0065; G02B 13/009; G02B 13/001; G02B 7/04; G02B 13/02; G02B 13/16; G02B 13/22; G02B 27/1066; G02B 3/0037; G02B 3/0056; G02B 5/045; G02B 5/08; G02B 7/28; G02B 15/04; G02B 27/0093; H04N 5/23212; H04N 5/2254; H04N 5/2258; H04N 5/23296; H04N 5/2253; H04N 5/2257; H04N 5/23293; H04N 5/2355; H04N 5/23232; H04N 5/265; H04N 5/23258; H04N 5/335; H04N 5/23219; H04N 5/2354
See application file for complete search history.

(56) References Cited

U.S. PATENT DOCUMENTS

| 6,848,108 | B1 | 1/2005 | Caron |
| 7,051,042 | B2 | 5/2006 | Krishnaprasad et al. |
| 2007/0282825 | A1* | 12/2007 | Toub ............................... 707/5 |
| 2010/0169792 | A1* | 7/2010 | Ascar et al. ................... 715/744 |

OTHER PUBLICATIONS

Florian Mueller, Andrea Lockerd, "Cheese: Tracking Mouse Movement Activity on Websites, a Tool for User Modeling", Conference on Human Factors in Computing Systems, CHI '01 extended abstracts on Human factors in computing systems, Seattle, Washington, Session: Short talks: of mice and measures, pp. 279-280, Year of Publication: 2001, ISBN: 1-58113-340-5, MIT Media Lab, 2001, Cambridge, MA 02139 USA.

* cited by examiner

*Primary Examiner* — Jeffrey A Gaffin
*Assistant Examiner* — Ayesha Huertas Torres

(57) ABSTRACT

During an interaction with a web page, user interface events are recorded and augmented with page layout data from the document object model. An event stream is formed with the page layout data and communicated to an event server. The event server processes the event stream to determine a location at which the events were generated and determines attention data for each event stream that indicates where a user's attention was directed during an interaction. The attention data for a plurality of event streams is aggregated to determine common or popular areas of interest of the web page.

18 Claims, 11 Drawing Sheets

110

| Event | e1 | e2 | e3 | e4 | e5 | e6 | e7 | e8 | e9 | e10 | e11 | e12 | e13 | e14 | ... |
|---|---|---|---|---|---|---|---|---|---|---|---|---|---|---|---|
| Event type | ms. mov | ms. mov | ms. mov | ms. mov | ms. mov | ms. mov | ms. mov | ms. mov | ms. mov | ms. mov | ms. mov | ms. mov | ms. mov | ms. mov | ... |
| x | 100 | 102 | 104 | 106 | 110 | 119 | 121 | 123 | 126 | 131 | 135 | 138 | 140 | 142 | ... |
| y | 100 | 101 | 100 | 99 | 106 | 115 | 117 | 115 | 112 | 108 | 105 | 99 | 101 | 102 | ... |
| time | 0 | 5 | 10 | 15 | 18 | 20 | 28 | 38 | 45 | 50 | 55 | 60 | 65 | 70 | ... |
| DOM element | div | div | div | body | div | div | span | div | div | div | div | body | div | div | ... |

| Attention event | a1 | a2 | ... |
|---|---|---|---|
| Attention event type | linger | hint | ... |
| Time interval | 0-70 | 15-50 | ... |
| DOM elements | <div> 100% | <span> 20% <br> <a id="link1"> 80% | ... |

Figure 12

SYSTEM, METHOD AND COMPUTER READABLE MEDIUM FOR DETERMINING ATTENTION AREAS OF A WEB PAGE

FIELD OF THE INVENTION

This disclosure relates to a system, method and computer readable medium for determining content interest areas of a web page using user events generated at an interface.

BACKGROUND OF THE INVENTION

In many web based applications, it may be beneficial to determine where the attention of a user is focused during an interaction. One existing solution is to use click stream data, it being considered that a user's attention is directed towards the location of the click. However, click stream data is typically coarse grained and there can be relatively long periods of time between complete mouse click events in which the focus of the user's attention is unknown. In addition, click stream data may indicate only the area of interest for a single user in a single interaction.

What is required is a system, method and computer readable medium for better determining the common or popular attention areas of a web page.

SUMMARY OF THE INVENTION

In one aspect of the disclosure, there is provided a method for determining attention areas of a web page. The method comprises recording event data for a plurality of user interactions with the web page, processing the event data for at least one interaction to create an attention data set for that interaction, and processing a plurality of the attention data sets to determine aggregate attention data for the web page.

In one aspect of the disclosure, there is provided a system comprising at least one event server and at least one web server. The web server is configured to generate a web page and provide the web page to a client browser. The web page comprises web page content visible to a user and an event observer module. The event observer module records user events generated in respect of the webpage content and communicates event stream data comprising the user events to the at least one event server. The at least one event server is configured to receive a plurality of event streams recorded by a plurality of the event observer modules in a plurality of the web pages generated by the at least one web server, and process the plurality of event streams to rank the popularity of a plurality of elements of the web page content.

In one aspect of the disclosure, there is provided a computer-readable medium comprising computer-executable instructions for execution by a processor, that, when executed, cause the processor to receive a plurality of event streams comprising a plurality of events generated during a plurality of user interactions with a web page. For each event stream, the processor determines a document object model element of the web page at which each event occurred, and determines an amount of user interest attributable to each document object model element. The processor aggregates the user interest for each document object model element from a plurality of event streams and ranks the document object model elements of the web page dependent on the relative user interest.

BRIEF DESCRIPTION OF THE DRAWINGS

Reference will now be made, by way of example only, to specific embodiments and to the accompanying drawings in which:

FIG. 11 illustrates a table of event data from the mouse move events of FIG. 10;

FIG. 12 illustrates a table of attention event data from the mouse move events of FIG. 10;

DETAILED DESCRIPTION OF THE INVENTION

Figure 1:
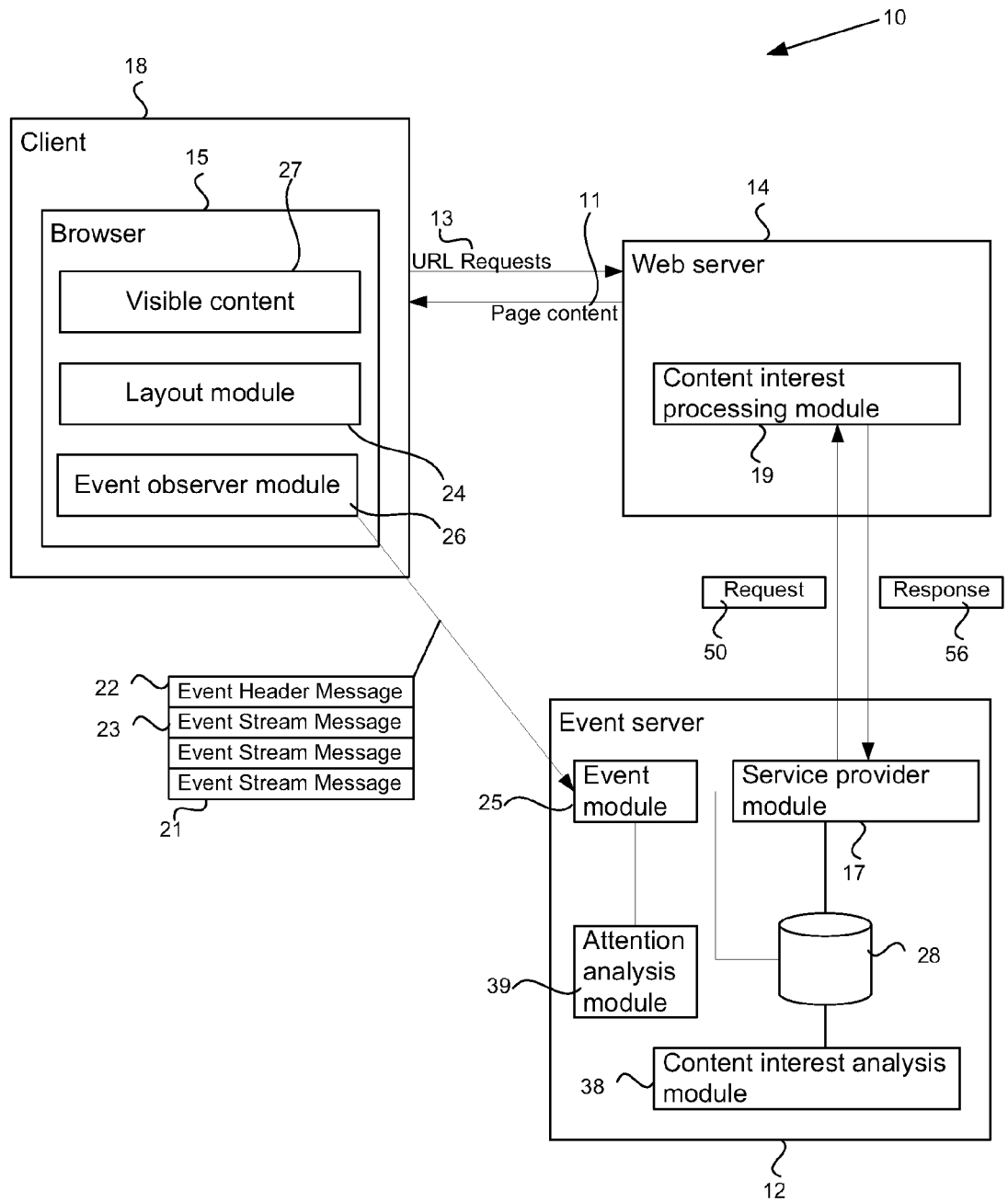
FIG. 1 illustrates a system for determining attention areas for a web page interaction.

A system in accordance with an embodiment of the disclosure is depicted in FIG. 1. In the system 10, a client 18 provides web page requests 13 to a web server 14, in response to which, the web server 14 provides page content 11 for display in a browser 15 of the client 18. Typically, the web page 11 will include visible content 27 as well as javascript applications.

In typical webpage protocols, a document object model (DOM) of a webpage structure may include a document, a body and several elements, including elements embedded within each other. Events, in particular user triggered events such as mouse movements (i.e. cursor movements), mouse clicks or keyboard events may be generated at various locations on the page. Application code, e.g. javascript applications, running in the webpage environment may register event handlers on various web page objects. The event handlers may handle events in a variety of ways. A first event handling method is referred to as event capturing. Event capturing provides an event first to the top most object in the web page hierarchical structure, i.e. DOM, and onward in a descending fashion as follows:

DOCUMENT→BODY→ELEMENT A→ELEMENT B

Event bubbling provides an event first to the bottom most object and onward in an ascending fashion as follows:

ELEMENT B→ELEMENT A→BODY→DOCUMENT

Figure 2:
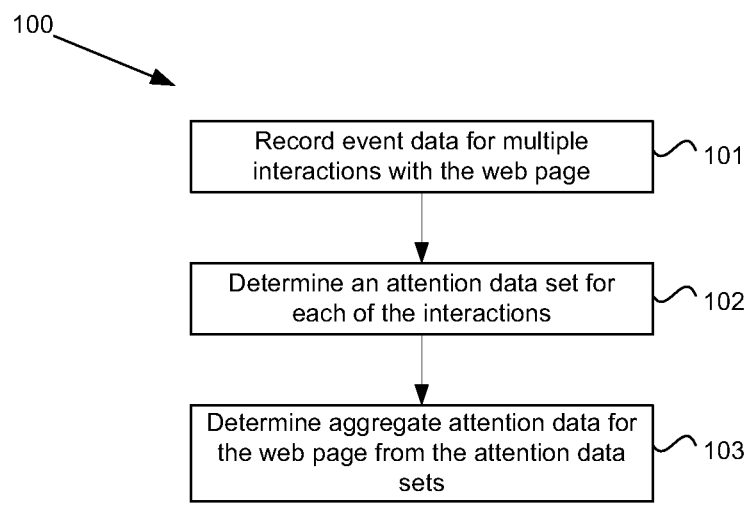
FIG. 2 illustrates a method for determining attention areas of a web page.

In accordance with an embodiment of the disclosure, event data can be analyzed to determine what content of a web page is most popular amongst a plurality of users. One reason for determining popular content areas is for the dynamic placement of additional content such as advertising or other graphics, text, images, videos etc that are intended to capture the user's attention. A method for determining the common attention areas of a web page is illustrated in FIG. 2. At step 101, event data is recorded for a plurality of user interactions with the web page. At step 102, the event data is processed to create an attention data set for each of the interactions. The attention data sets are then processed 103 to determine aggregate attention data for the web page.

In accordance with an embodiment of the invention, the web server 14 is modified such that the web page content provided to the client 18 includes an event observer module 26 and layout module 24, both of which may be provided as appropriate code or scripts that run in the background of the client's browser 15. In one embodiment, code for providing the event observer module 26 and the layout module 24 is provided to the web server 14 by a third party service, such as provided from an event server 12, described in greater detail below.

The event observer module 26 and the layout module 24 may be provided as code embedded in a web page 11 from the web server 14. Alternatively or in addition, the event observer module 26 and the layout module 24 may be provided as a link back to the web server 14 or a third party server, e.g. event server 12, for the resource containing the code which the web browser will fetch as part of loading the web page.

The event observer module 26 observes events generated in a user interaction with the web page 11 at the client 18. The event observer module 26 records events generated within the web browser 15, such as mouse clicks, mouse moves, text entries etc., and generates event streams 21 including an event header message 22 and one or more event stream messages 23. It will be apparent to a person skilled in the art that terms used to describe mouse movements are to be considered broadly and to encompass all such cursor manipulation devices and will include a plug-in mouse, on board mouse, touch pad, pixel pen, etc.

The event observer module 26 provides the event streams 21 to the event server 12. The event server 12 may be as described in the Applicant's application Ser. No. 12/435,761, the entire contents of which are explicitly incorporated herein by reference, and includes an event module 25, an attention analysis module 39, and a suitable data store 28, which though shown in FIG. 1 within the event server 12, may also be provided as an offsite data store. The event server 12 also includes a service provider module 17 which interfaces with a processing module 19 of the web server 14. In embodiments of the present disclosure, the event server 12 may also include a content interest analysis module 38.

Figure 3:
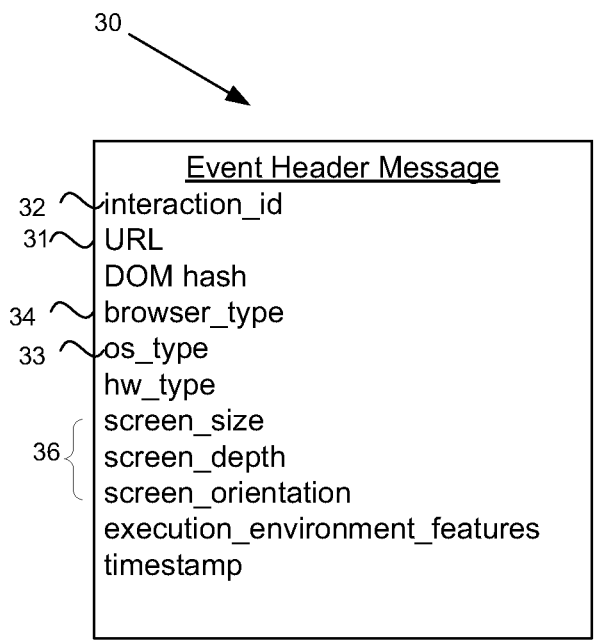
FIG. 3 illustrates an example of an event header message.
Figure 4:
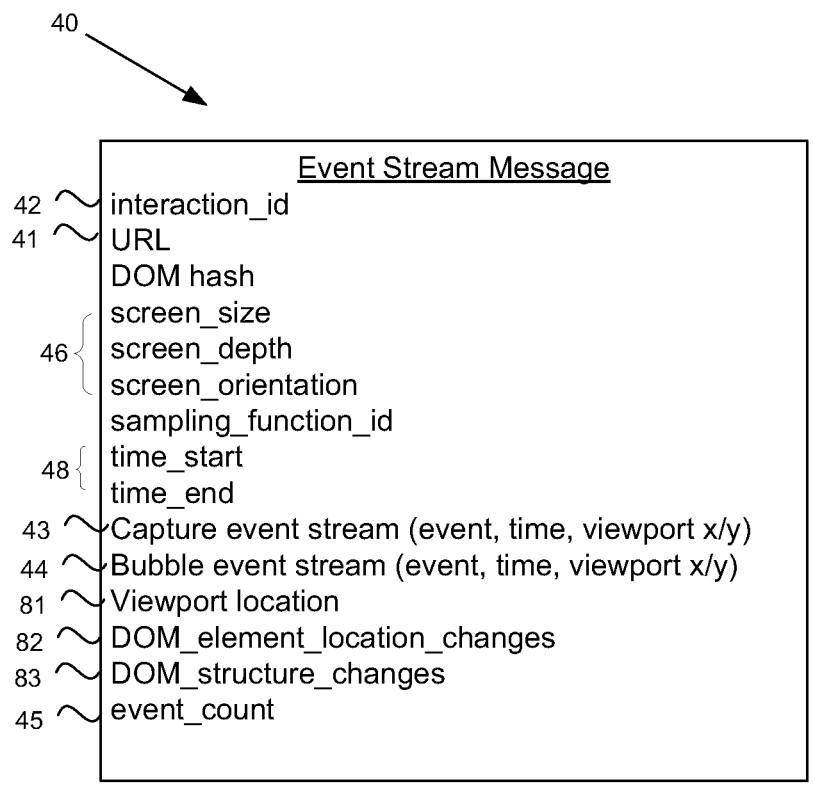
FIG. 4 illustrates an example of an event stream message.

An example of an event header message 30 is illustrated in FIG. 3 and an example of an event stream message 40 is illustrated in FIG. 4. The messages 30, 40 show a number of components that can be included, though in various embodiments, not all of these components may be required and additional components may be added. Primarily, an Interaction_ID 32, 42 uniquely identifies an interaction between the client 18 and the web server 14 and aids to identify the particular event stream 21. The event header message 30 and the event stream message 40 may also identify the Uniform Resource Locator (URL) 31, 41. Fixed parameters such as the operating system 33 and browser type 34 may form part of the event header message 30. Screen parameters 36, 46 such as the screen size, depth and orientation may be included in either or both of the event header message 30 or the event stream message 40. A capture event stream 43 and a bubble event stream 44 specifies the events recorded in respective event capture and bubbling phases during the web page interaction. Each event may be indicated by the event type, time and x/y location relative to the viewport. Not all web browser types support event capture, and thus the capture event stream 43 may be empty. Where required, events missing from the event bubble stream may be inferred, for example as described in the Applicant's U.S. Pat. No. 8,327,385, the entire contents of which are explicitly incorporated herein by reference. An event_count field 45 may indicate the total number of unique events observed by the event observer module including those events not included in the event stream message 40 due to a current sampling function excluding them. Timing parameters 48 may indicate the relevant period over which the event stream message 40 is current.

The event observer module 26 passes the event streams 21 to the event module 25 of the event server 12. In the embodiment illustrated in FIG. 1, the event streams 21 are provided directly to the event module 25. However, the event streams 21 may also be provided indirectly, e.g. via the web server 14.

The layout module 24 processes the web page content on the client browser 15 and augments the event stream messages 21 with viewport and DOM element layout information. Additional fields of the event stream messages 40 shown in FIG. 4 include a viewport location 81, DOM element location changes 82 and DOM structure changes 83. The DOM element location changes 82 and DOM structure changes 83 may be reported in absolute terms, or may be reported as changes in these parameters since the last report. The viewport location 81 may include a time interval over which the viewport location information can be considered valid. The viewport location may be presented as a list of viewport locations with timestamps in case the viewport changes more than once per event stream message.

During an interaction with the web page 11, a user navigates the web page 11 and may enter content where appropriate, such as in the HTML form elements. During this interaction events are generated and recorded by the event observer module 26. Events may include mouse clicks, mouse moves, key strokes etc. Periodically, the event observer module 26 formulates an event stream message 23, at which time, the event module provides a callback to the layout module 24 for layout data to be included in the event stream message.

Figure 5:
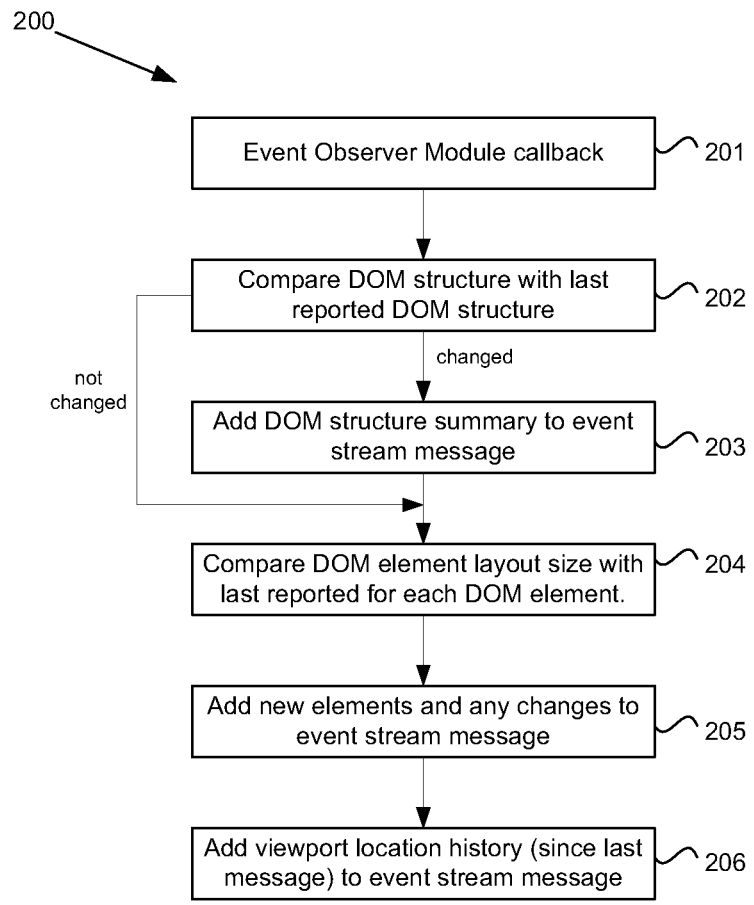
FIG. 5 illustrates an operation of a layout module.

A process 200 performed by the layout module 24 in response to the callback is shown in FIG. 5. The layout module 24 receives the event observer module callback at step 201 and proceeds to compare a current DOM structure of the web page 11 with the last reported DOM structure 202. The layout module 24 may register itself to watch DOM changes or may simply enumerate the structure as needed. If changes are observed, then a DOM structure summary is provided to the event observer module 26 to be added to the event stream message 23 (step 203). At step 204, the DOM element layout size is compared to the last reported layout size for each DOM element. New elements and any changes of the DOM element layout sizes are communicated 205 to the event observer module 26 for inclusion in the event stream message 23. The DOM element layout size can be computed using element properties "offset left" and "offset top" as is known. Alternatively, the events generated by the user, e.g. mousemove etc., can be correlated to the first element to see the event in the event bubbling phase. Since the events have x,y coordinate positions, the action of moving the mouse across a DOM element rendered in the viewport window will allow local recording of the size and location of the respective DOM element. At step 206, the viewport location history is communicated to the event observer module 26 for inclusion in the event stream message 23, after which the event stream message 23 may be communicated to the event server 12.

The event server 12 receives the event stream 21 including the augmented event stream messages 23 and processes the event streams in the event module 25. Events may be extracted from the event stream messages 23 together with the viewport data and communicated to the attention analysis module 39 for additional processing. If the event stream 21 includes a new InteractionID, data storage may be allocated in the data store and an initial DOM structure and element layout information may be recorded. The initial DOM structure may be received via the "DOM Hash" field of the Event Header Message. When additional event stream messages are received, any updates to the viewport location, DOM structure and DOM element layout are also stored.

Figure 6:
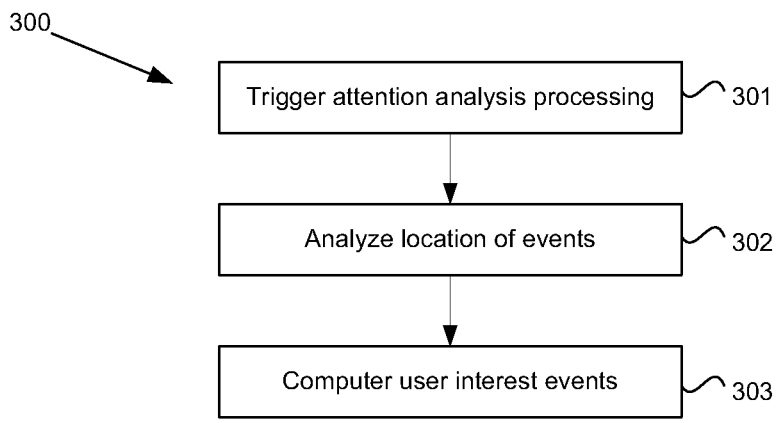
FIG. 6 illustrates an operation of an attention analysis module.

An operation 300 of the attention analysis module is shown in FIG. 6. At step 301, the attention analysis module 39 receives an analysis trigger, which might be a request, described in further detail below, or a timeout. The attention analysis module then analyzes the location of the events in the event stream messages relative to the DOM element location in the viewport in order to compute a probabilistic locus of attention for the user (step 302). Different people read web pages in different ways. For example, some people read with their mouse (e.g. the mouse pointer is continuously moved to remain close to where the are reading, either vertical movement line-by-line and/or horizontal movement word-by-word), others move the mouse to the side while reading, essentially "parking" the mouse pointer in an out of the way part of the viewport, and use the down arrow to move the viewport. The system may track estimated read time for the content of interest and correlate it to expected viewport movement time (for content that goes beyond the viewport). In one embodiment, the attention analysis module 39 computes the locus of attention from a plurality of mouse move events as these events can provide a fine grained indication of the user's focus in between mouse clicks. The locus of attention may be computed and stored as the user attention time per DOM element. In addition, the attention analysis module 39 may compute attention events (step 303) such as hints, lingers, hovers, partial clicks, cancelled clicks, "on element exits" etc, any of which may assist in determining where a user's attention is directed. For example, a mousedown event followed by a mousemove may not register as a complete mouseclick, in particular if the mouseup event occurs off of a particular web page element. However, the mousedown, mousemove and mouseup events together may indicate a region of the user's interest or attention focus. In a further example, a mouse move followed by a brief period of time before the next mouse move may indicate a hover over a region of interest to the user.

The attention time and any attention events may be computed for any DOM element or for DOM elements that have a particular identifier attribute within the page. This allows a web page designer to specify content areas for which to monitor user interest.

Once the attention analysis has been performed, an attention data set comprising the results of the attention analysis and the event stream or interaction data may be stored in the data store 28. A statistical analysis of the attention data set may be performed by the content interest analysis module 38. By making use of the event data and the attention analysis data in the attention data set, aggregate measures may be formed over multiple URL visits from multiple users to determine a ranking of the content areas of a web page.

Figure 7:
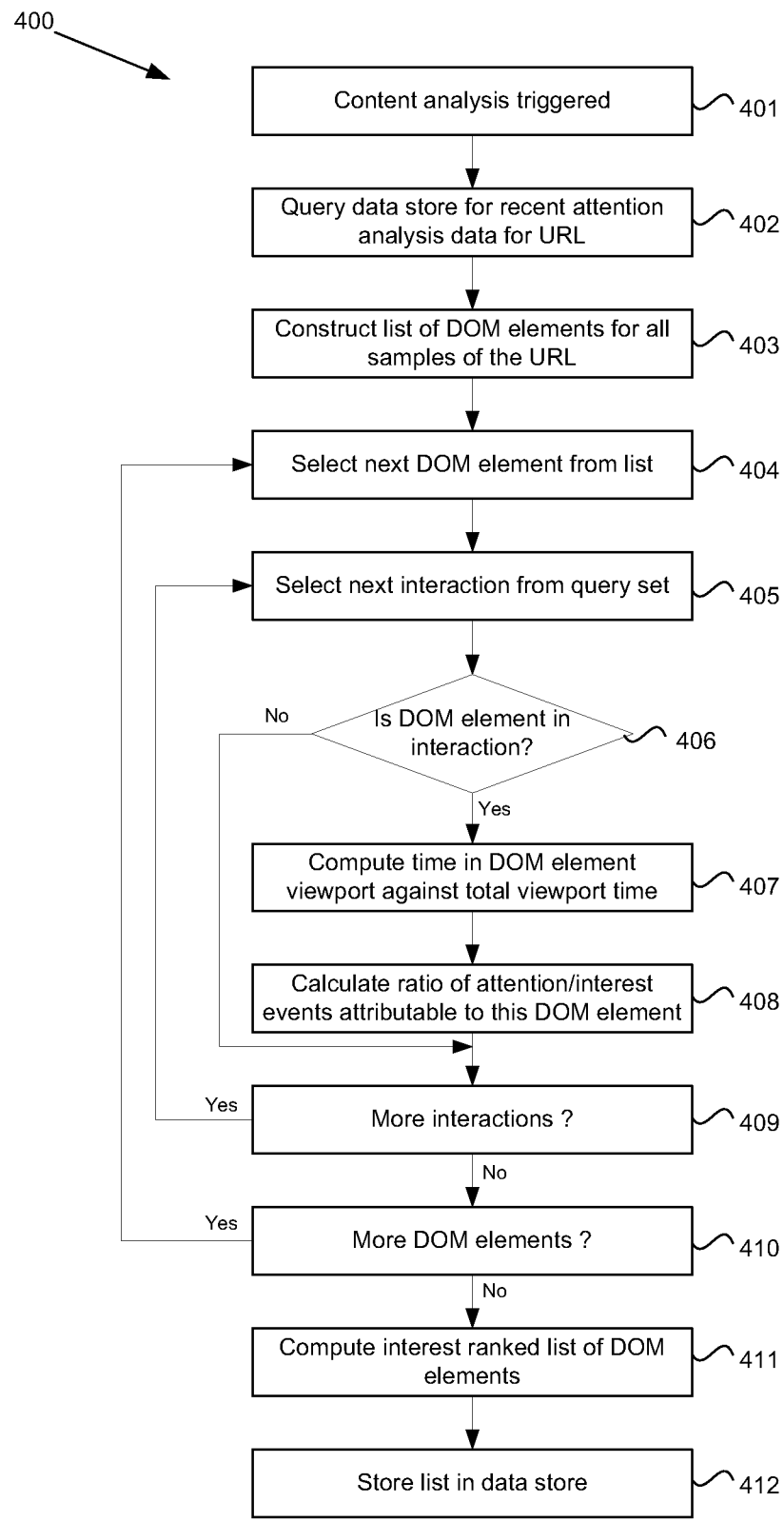
FIG. 7 illustrates an operation of a content interest processing module.

An example of the statistical analysis is depicted in the flowchart 400 of FIG. 7. Content interest analysis may be triggered at step 401 by a periodic timeout, an accumulation of unanalyzed data, a change in DOM structure, receipt of a request, or by any other suitable trigger. Content interest analysis is performed in respect of a URL, so at step 402, the data store 28 is queried for recent attention analysis data in respect of a particular URL. Any particular web page may be provided with different versions. Different samples of the web page may therefore include differing DOM elements. A query list of all DOM elements for all samples of the URL is constructed at step 403. A first DOM element is selected at step 404 and a first interaction is selected from the query list at step 405. If the DOM element is determined to be in the interaction at step 406, then the amount of time in the DOM element viewport relative to the total viewport time is determined at step 407. Total viewport time data may be determined from time stamp information 48 in the event stream messages 40 (FIG. 4). Event timing for individual elements in the viewport can be determined from the capture event streams 43 and/or bubble event streams 44.

The time in viewport may be computed dynamically or may have been computed at an earlier stage, e.g. during attention analysis described above and stored locally. The time in viewport may consider only the active time, that is the time where a certain event rate is maintained rather than the viewport remaining idle.

At step 408, the ratio of attention and/or interest events attributed to this DOM element relative to the total attention and/or interest events is computed. Interest events may be those events in the attention analysis data analyzed from the event stream such as hints, lingers, hovers, partial clicks, cancelled clicks and/or "on element" exits.

Once the viewport time ratio and the attention/interest events ratios have been calculated for a particular DOM element in a particular interaction, then the process may be repeated for other interactions. If more interactions for the currently selected DOM element exist, as determined at step 409, then a next interaction is chosen by returning to step 405. Once all interactions in the query set have been analyzed with respect to the currently selected DOM element, then a next DOM element is selected from the query list, if available (query step 410), by returning to step 404 and the interactions for the newly selected DOM element are analyzed following the steps described above.

After all DOM elements for the URL have been analyzed, a ranked list of DOM elements can be calculated from the sum of the viewport time ratios and the attention/interest event ratios (step 411). The ranked list(s) may be stored 412 in the data store 28 for later processing or provided immediately to the web server 14.

While the flowchart 400 of FIG. 7 depicts one form of statistical analysis, other forms of statistical analysis that process the event stream data to determine the popularity of content areas of the webpage will be apparent to a person skilled in the art.

Figure 8:
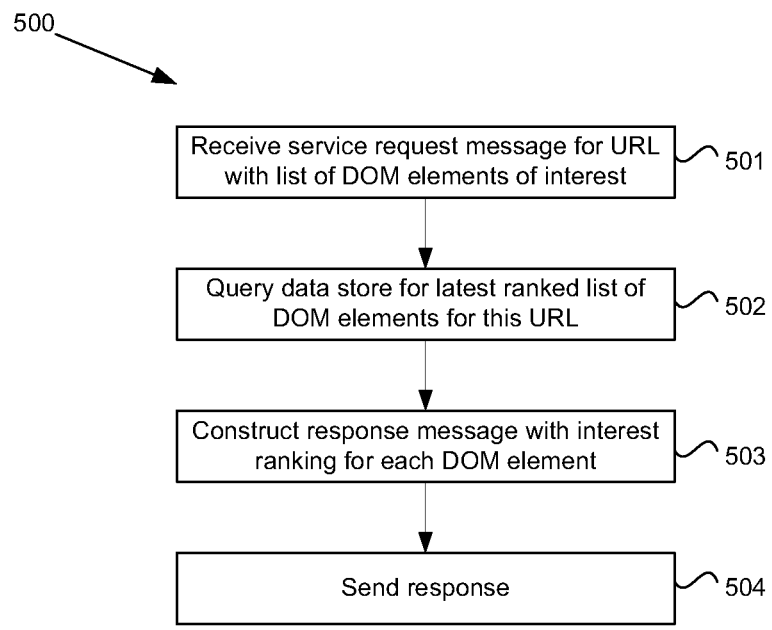
FIG. 8 illustrates a process for providing attention analysis data to a web server.
Figure 9:
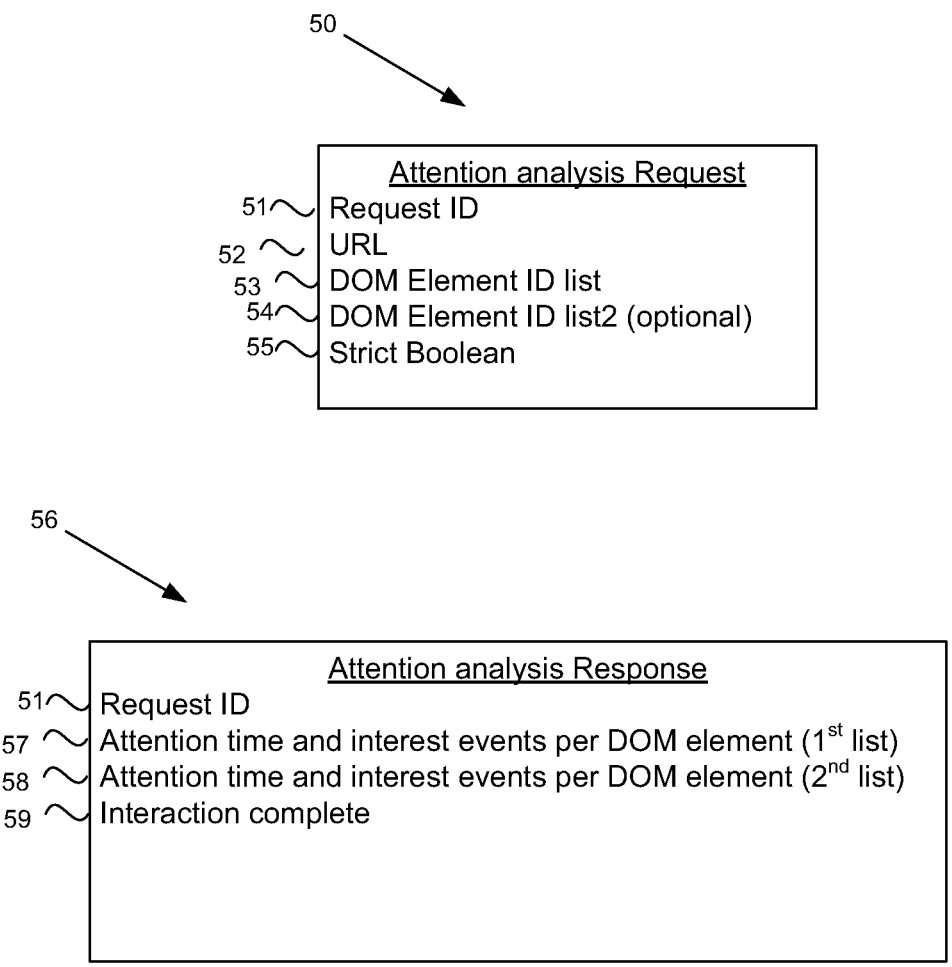
FIG. 9 illustrates an attention analysis request and response.

In one embodiment, content interest analysis is provided as a service to web servers 14. The DOM element rankings may be stored in the data store 28 until a content interest analysis request 50 is received from the content interest processing module 19 of the web server 14. A content interest analysis service is depicted in the flowchart 500 of FIG. 8. At step 501, the service provider module 17 of the event server 12 receives a service request message 50 from the content interest processing module 19 of the web server 14. As shown in FIG. 9, the request message 50 includes a Request ID 51, a URL 52, a first DOM Element ID List 53, an optional second DOM Element ID List 54 and a Strict Boolean 55. In the case where the web page and elements are frequently changing on the web server, a time range or DOM hash may be added to the request to correctly identify the DOM. The Request ID 51 identifies the particular request message and its subsequent response. The URL 52 allows the event server 12 to retrieve content interest data from the data store for the specified URL at step 502, as per step 402 of FIG. 7. The content interest data will include the latest ranked list of DOM elements for the URL.

The DOM Element ID List 53 allows the requester to specify DOM elements of interest. At step 503, a response message 56 is constructed with the interest ranking for each DOM element specified in the request list. The response message 56 (FIG. 1) is returned to the content interest processing module 19 of the web server 14 at step 504. An example of the response message 56 is also illustrated in FIG. 9 and includes the same Request ID 51 as well as a first Ranked Element list 57 in respect of the first DOM Element ID List 53, additional Ranked Element lists 58 in respect of the additional DOM Element ID lists 54 and a strict Boolean 59.

If a second DOM Element ID List 54 is provided, the intersection of the lists restricts the subset of interactions considered in the interest computation. In one embodiment, additional DOM Element ID lists 54 allow the content interest processing module 19 of the web server 14 to compare the interest of alternating page elements. For example, a webpage identified by a URL may be provided with alternating versions. A first version may include an element A, while a second version may include an element B. Provided enough samples are collected for each version, then a first DOM Element ID List 53 may specify DOM element A, while the second DOM Element ID List 54 may specify the DOM element B. The first Ranked Element List 57 in the response message 56 will therefore include the interest analysis for element A and the second Ranked Element list 58 will include the interest analysis for element B.

The strict Boolean 55 in the request message 50, if set to TRUE, ensures that the same number of samples, i.e. interactions, are used for all of the DOM elements during the computations. Similarly, the strict Boolean 59 in the response message 56, if set to TRUE, indicates that the same number of samples was used for all of the DOM elements.

As described in the Applicant's application Ser. No. 12/435,761, referenced above, only some of the DOM elements, i.e. particular DOM elements of interest, may undergo attention analysis. In the present disclosure, the content interest analysis module 38 may perform its processing on a subset of DOM elements stored in the data store 28. When processing is performed on a subset, only the directly correlated data may be used, that is, the data in the event stream and attention analysis stream that is recorded in respect of a DOM element within the subset. Alternatively, the content interest analysis module 38 may process data to DOM elements not in the subset in order to assign the event stream events and attention events to DOM elements in the subset.

Within the system, DOM elements may be identified in a number of ways. Typically, DOM elements must be identifiable within the layout module 24, content interest analysis module 38 and the content interest processing module 19. DOM element identification is consistent across these components. In one embodiment, the DOM element is identified by a bare identification attribute on the DOM element/page element, by an identifier based on the DOM structure and its location within that structure, or by the element's pageport location (the pageport is an artificial viewport that is exactly large enough to contain all rendered page elements).

In an alternative embodiment, a DOM element identifier may by combined with a hash of the content of the element, a locality sensitive hash (LSH) code of the content of the element, a one-way (cryptographic) hash of the content of the element and/or the actual content of the element. In these embodiments, the content changing within a DOM element can be treated with different interest analysis. If an LSH code is used, such as Nilsimsa digest or similar, it is built using the content of the DOM element (e.g. the text that is displayed) but may optionally be built to include attributes from HTML and/or CSS where those attributes affect the display of the DOM element content. The result is that DOM elements with nearly equivalent content have nearly equivalent LSH codes in their DOM element identifiers. This allows two DOM elements, from different interactions, to be considered the same for analysis if they have sufficiently similar LSH codes. The disadvantage of including more content within the DOM element identifier is that it requires more bandwidth and storage, but has the advantage of allowing greater analysis and security. The DOM element content may be communicated to the event server 12 in the event streams, or, more likely, may be communicated from the web server 14 in response to a content update request from the event server 12.

Figure 10:
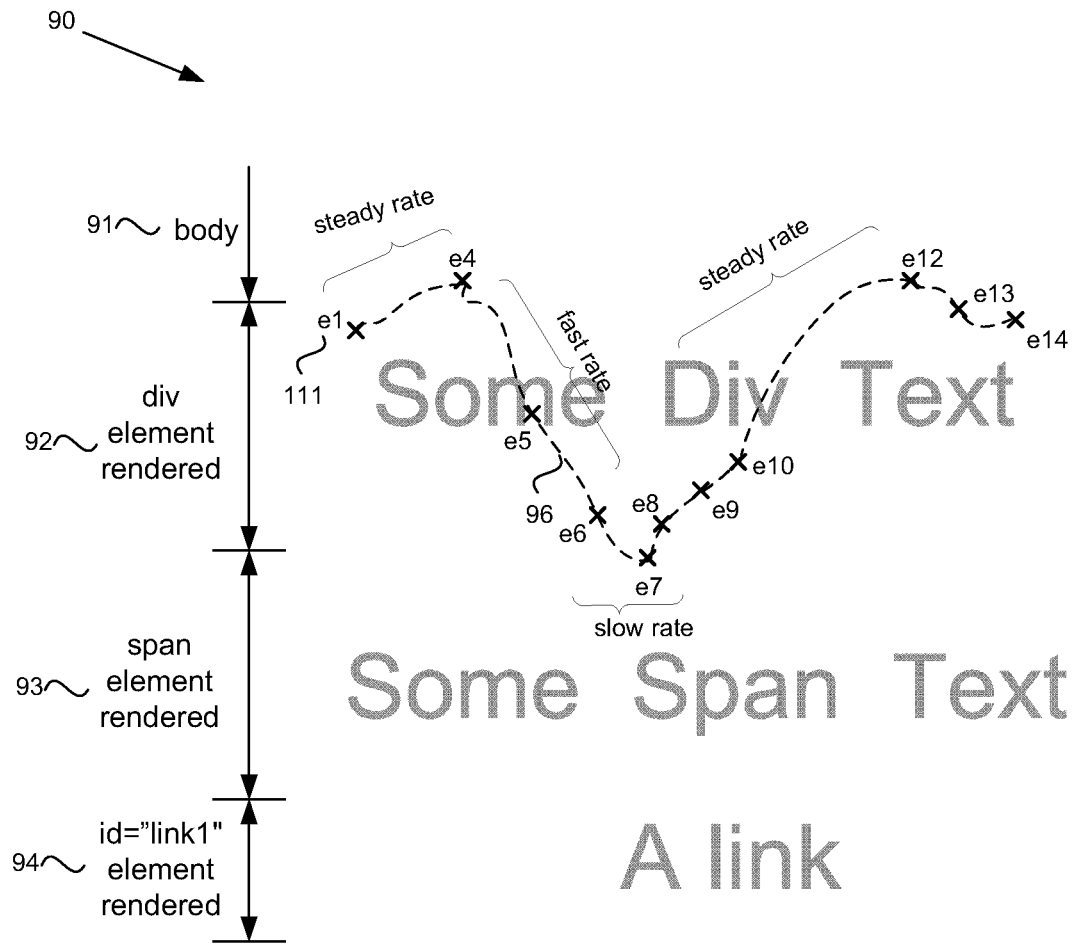
FIG. 10 illustrates a web page portion with mouse move events.

A magnified sample of an illustrative web page 90 is shown in FIG. 10. In the example, the web page 90 includes a body 91, a div element 92 with "Some Div Text" as its content, a span element 93 with "Some Span Text" as its content and a link element 94 featuring "A link" as its content. The representative text is shown in a ghosted font to indicate that the actual content of the web page is relatively unimportant. The important aspects of the page are the page structure, the DOM elements and where the events occur with respect to the DOM elements.

In the example, a mouse path 96 registers mouse move events e1 . . . e14. In the events shown, the mouse tracked steadily across the top of the "So" in the rendered <div> text "Some Div Text" (e1-e4) and then tracked swiftly down through the word "Some". The mouse then moved slowly (e6-e9) and then tracked upwards to resume a steady pace along the top of the rendered <div> element (e9-e14).

A table representing the mouse move events is shown in FIG. 11. For example, the table 110 of FIG. 11 shows that event e1 occurred at time=0 and at location x=100, y=100 which, as indicated in the table 110, occurs in the <div> element 92. The event type was recorded as a mouse move event. For the path 96 of FIG. 10, table 110 of FIG. 11 indicates that the events e4, e12 were received first in the event bubbling phase by the <body> element event handlers and e7 was received by the <span> event handlers. That is, in this mouse path 96, the mouse moved off of the <div> element three times, twice above the rendered <div> text and onto the <body> element (e4, e12) and once below the <div> element onto the <span> element (e7).

FIG. 12 shows corresponding attention analysis data 120 for the tabulated event 110 data of FIG. 11. The attention analysis concludes that events e1-e14 corresponding to time=0 to time=70 constitute a "linger" attention event "a1" and that the attention was focused 100% on the <div> element of the DOM. [Note that an event occurring on a DOM element may not indicate the attention is on that element (e.g. e4, e7, e12).] Also, the downward gesture corresponding to events e4-e10 may be analyzed as a "hint" which has a probabilistic assessment of being a hint of the attention shifting to the <span> element, with a 20% probability, and a hint to the <a id="link1"> element with a probability of 80%. This example thus shows that a single stream of user events may be analyzed to contain multiple attention events. The attention analysis data 120 may be stored in the data store with the associated event stream provided by table 110. This example serves to illustrate two additional points are illustrated here. Events may not indicate attention on or for the DOM element on which the events are received e.g. the e4, e7, and e12 events are analyzed to indicate the <div> is receiving 100% of the "linger" attention event. Attention may be analyzed to be more relevant to DOM elements that are farther away from the DOM element(s) receiving the events e.g. attention event a2 receives (derives from) events that arrived on the <div> element but the "hint" was analyzed as being 80% likely relevant to the <a id="link1"> element which is further away than the <span> element which received only a 20% likelihood of being the target of this "hint" attention event. "Farther away" here means primarily the measure of the DOM elements as rendered in the viewport (viewport rendering location) but could also be approximated using the distance measure of the DOM elements within the structure of the DOM itself (DOM structure location). For the analysis to choose a "farther away" DOM element as the attention event target over a closer DOM element several factors may be considered. The rate of the underlying mouse movement during the events e4-e10 may contribute as may other factors such as the type of a possible target DOM element, if the DOM element is changing (scrolling, animated, video), is the style/color/font different from the source or intervening DOM elements, etc.

The attention analysis demonstrated in FIGS. 10 to 12 describes the analysis performed in respect of a portion of a single interaction. By repeating the process across many interactions from many clients for a single URL, aggregate data describing average areas of attention may be statistically determined.

The above described embodiments demonstrate a content interest analysis being performed in a distinct event server 12. In an alternative embodiment, any of the event module 25, attention analysis module 39 and content interest analysis module 38 may be provided as components of the web server 14, such that all processing of the event streams, including determining the aggregated areas of interest may be performed within the web server 14.

Figure 13:
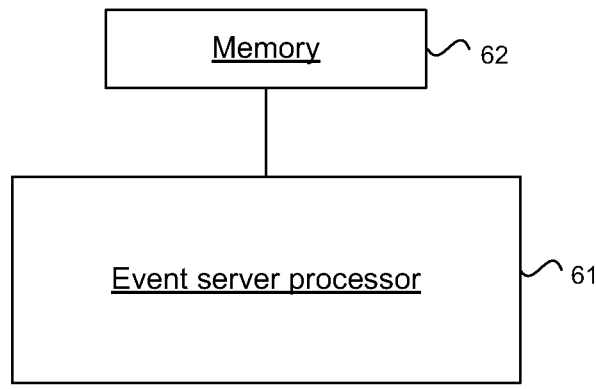
FIG. 13 illustrates a processor and memory of an event server.
Figure 14:
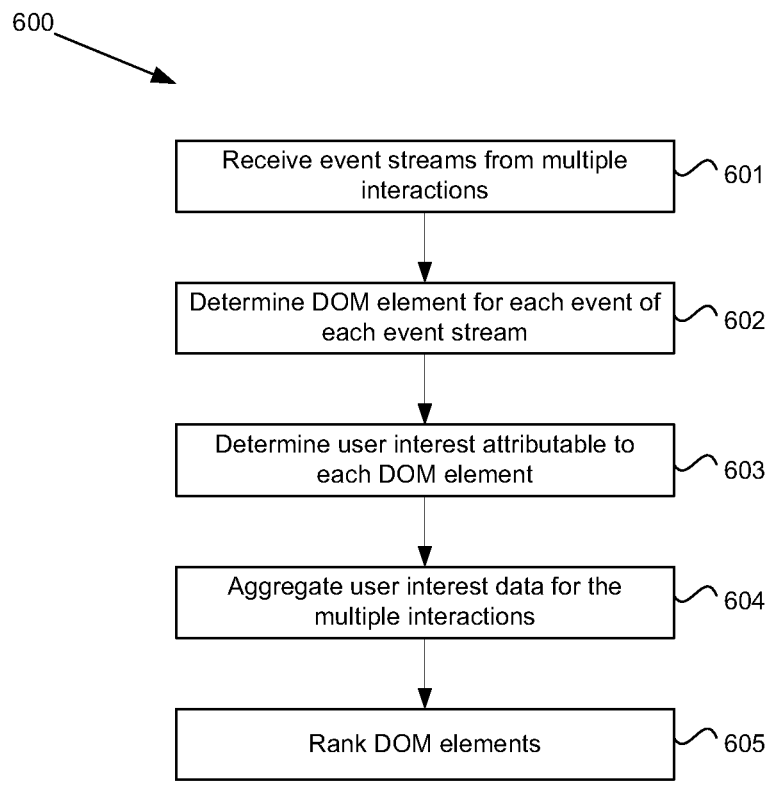
FIG. 14 illustrates an instruction set that may be executed on the processor and memory of FIG. 13.

In one embodiment, the event server 12 may include a processor 61 operatively associated with a memory 62 as shown in FIG. 13. The memory 62 may store instructions that are executable on the processor 61. In addition, the memory 62 may provide elements of the data store 28. An instruction set 600 that may be executed on the event server processor 61 is depicted in the flowchart of FIG. 14. Specifically, when executed, the instruction set 600 allows the processor to receive a plurality of event streams from a plurality of user interactions with a web page 601. For each event stream, the processor 61 determines a DOM element of the web page at which each event in the event stream occurred 602 and determines an amount of user interest attributable to each DOM element 603. The processor aggregates the user interest for each DOM element from a plurality of event streams 604 and ranks the DOM elements of the web page dependent on the relative user interest 605.

Figure 15:
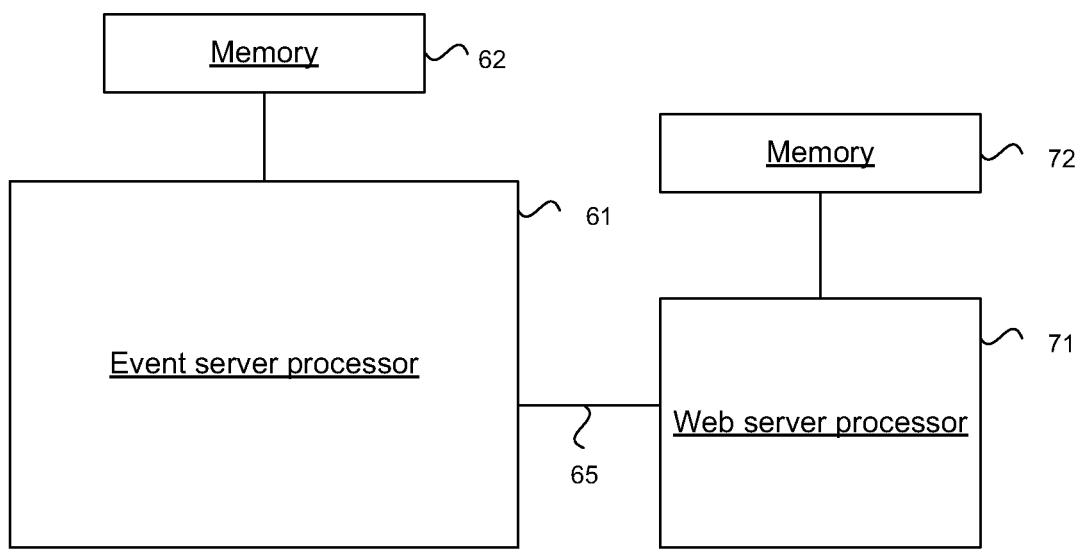
FIG. 15 illustrates the processor and memory of FIG. 13 in association with a processor and memory of a web server.

The ranking of the document object models may be performed in response to a request received from a second processor, such as processor 71 of a web server shown in FIG. 15, that may also be operatively associated with a memory 72. The second processor 71 may provide the request through a suitable communications link 65 in a service request, such as the request 50 described above. The processor 61 may generate a response message including the ranking of the DOM elements and provide the response message to the web server processor 71.

An advantage of the embodiments described above includes that the event data provides fine grained attention tracking which is hard to falsify by automated means. By performing a statistical analysis of the event data across multiple interactions the most popular areas of a web page that attract the attention may be determined. Such information may be used in many content placement applications, such as the placement of ad content as described in the Applicant's application Ser. No. 12/435,770, the entire contents of which are explicitly incorporated herein by reference.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for determining attention areas of a web page, the method comprising:
    providing an event observer module to the content of a webpage such that when the webpage is viewed in a browser at a client, the event observer module is able to record user events as the user browses the webpage;
    providing a layout module to the content of the webpage such that the layout module is able to record a layout of the webpage within a web browser;
    recording event data for a webpage interaction between a user and the webpage in a browser at a client comprising:
        recording a plurality of events by the event observer module;
        recording page layout data by the page layout module and providing the page layout data to the event observer module;
        generating, by the event observer module, an event stream comprising an event header message and at least one event stream message, wherein the event header message comprises an interaction identifier, a webpage identifier and the page layout data and wherein the at least one event stream message comprises the interaction identifier, at least one of a capture events field and a bubble events field comprising at least some of the plurality of events, wherein at least one of the event header message and the at least one event stream message comprises at least one of a document object model structure of the webpage and a document object model layout of the webpage; and
        providing the event stream from the client to an event server;
    processing, at the event server, the event data for the webpage interaction to create an attention data set for that webpage interaction that identifies one or more document object model elements that received at least one event during the webpage interaction;
    receiving a plurality of the event streams at the event server for a plurality of webpage interactions for a plurality of users;

processing, at the event server, the plurality of event streams to create a plurality of the attention data sets; and processing the plurality of the attention data sets to determine aggregate attention data for the web page, wherein the aggregate attention data comprises at least one ranked list of document object model elements for the web page.

2. The method according to claim 1 wherein processing the event data comprises determining at least one attention event from the event data.

3. The method according to claim 1 wherein recording event data comprises:

recording a document object model of the web page, the document object model comprising at least one document object model element;

recording the user interface events; and determining the location of the user interface events relative to the at least one document object model element.

4. The method according to claim 3 wherein recording the user interface events comprises recording a plurality of mouse move events.

5. The method according to claim 3 wherein processing a plurality of the attention data sets comprises:

selecting a document object model element;

selecting an attention data set; and determining a ratio of interaction time attributable to the selected document object model element relative to the total interaction time of the selected attention data set.

6. The method according to claim 5 wherein the aggregate attention data comprises a list of document object model elements for the web page ranked at least partially dependent on said ratio.

7. The method according to claim 3 wherein processing the event data comprises determining at least one attention event in respect of at least one document object model element, and wherein processing a plurality of the attention data sets comprises:

selecting a document object model element;

selecting an attention data set; and determining a ratio of attention events attributable to the selected document object model element relative to the total interaction time of the selected attention data set.

8. The method according to claim 7 wherein the aggregate attention data comprises a list of document object model elements for the web page ranked at least partially dependent on said ratio.

9. The method according to claim 3 wherein processing the event data comprises determining at least one attention event in respect of at least one document object model element, and wherein processing a plurality of the attention data sets comprises:

selecting a document object model element;

selecting an attention data set; and determining a ratio of attention events attributable to the selected document object model element relative to the total attention events of the selected attention data set.

10. A system comprising:

at least one event server;

at least one web server configured to:

generate a web page comprising:

web page content visible to a user;

an event observer module that records user events generated in respect of the webpage content within a web browser and communicates event stream data comprising the user events to the at least one event server; and a layout module that records a layout of the webpage within a web browser; and provide the web page to a client browser;

wherein the event observer module is configured to execute within a client browser to record event data for a webpage interaction between a user and the webpage in the client browser such that the event observer module records a plurality of events and receives page layout data by the page layout module and providing the page layout data to the event observer module;

wherein the event observer module, when executed within the client browser, generates an event stream comprising an event header message and at least one event stream message, wherein the event header message comprises an interaction identifier a webpage identifier and the page layout data and wherein the at least one event stream message comprises the interaction identifier, at least one of a capture events field and a bubble events field comprising at least some of the plurality of events, wherein at least one of the event header message and the at least one event stream message comprises at least one of a document object model structure of the webpage and a document object model layout of the webpage; and wherein the event observer module provides the event stream from the client to the event server;

wherein the at least one event server is configured to:

process the event data for the webpage interaction to create an attention data set for that webpage interaction that identifies one or more document object elements that received at least one event during the webpage interaction;

receive a plurality of the event streams for a plurality of webpage interactions for a plurality of users;

process the plurality of event streams to create a plurality of the attention data sets; and process the plurality of the attention data sets to determine aggregate attention data for the web page, wherein the aggregate attention data comprises at least one ranked list of document object model elements for the web page.

11. The system according to claim 10 wherein the web page is generated to comprise a layout module that augments the event stream data with page layout data.

12. The system according to claim 10 wherein the event observer module is generated to record a plurality of mouse move events and a location at which the respective mouse move event occurred.

13. The system according to claim 10 wherein the event server is configured to: process an event stream to determine one or more attention events; and attribute the one or more attention events to the one or more document object model elements.

14. The system according to claim 13 wherein the content interest processing module is configured to rank the popularity of the document object model elements dependent on the attention events attributed to the document object model elements for a plurality of event streams.

15. The system according to claim 10 wherein the event server is configured to apportion a time period of an event stream to the plurality of document object model elements.

16. The system according to claim 15 wherein the content interest processing module is configured to rank the popularity of the document object model elements dependent on the time apportionments for a plurality of event streams.

17. A non-transitory computer-readable medium comprising computer-executable instructions for execution by a processor, that, when executed, cause the processor to:

receive an event stream from a client browser executing a webpage, the webpage comprising:
  a layout module that records a la out of the webpage within the client browser during a webpage interaction; and
  an event observer module that receives the layout from the layout module, records user events generated in respect of webpage content within the client browser and generates the event stream comprising an event header message and at least one event stream message, wherein the event header message comprises an interaction identifier, a webpage identifier and the page layout data and wherein the at least one event stream message comprises the interaction identifier, at least one of a capture events field and a bubble events field comprising at least some of the user events wherein at least one of the event header message and the at least one event stream message comprises at least one of a document object model structure of the webpage and a document object model layout of the webpage; and process the event data for the webpage interaction to create an attention data set for that webpage interaction that identifies one or more document object elements that received at least one event during the webpage interaction;

receive a plurality of the event streams for a plurality of webpage interactions for a plurality of users;

process the plurality of event streams to create a plurality of the attention data sets; and process the plurality of the attention data sets to determine aggregate attention data for the web page, wherein the aggregate attention data comprises at least one ranked list of document object model elements for the web page.

18. The non-transitory computer-readable according to claim 17 comprising instructions, that when executed by the processor, cause the processor to:
  generate a message comprising the rank of document object model elements; and
  provide the message to a processor of a web server.

* * * * *